US012734406B2

(12) United States Patent
Yeh et al.

(10) Patent No.: US 12,734,406 B2
(45) Date of Patent: Sep. 15, 2026

(54) AUTOMATIC ANALYSIS SYSTEM AND METHOD FOR FITNESS TRAINING

(71) Applicant: INVENTEC APPLIANCES CORP., New Taipei City (TW)

(72) Inventors: Che-Hung Yeh, New Taipei City (TW); Sheng-Hsiung Hu, New Taipei City (TW)

(73) Assignee: Inventec Appliances Corp., New Taipei City (TW)

( * ) Notice: Subject to any disclaimer, the term of this patent is extended or adjusted under 35 U.S.C. 154(b) by 295 days.

(21) Appl. No.: 18/596,079

(22) Filed: Mar. 5, 2024

(65) Prior Publication Data

US 2025/0135285 A1 May 1, 2025

(30) Foreign Application Priority Data

Oct. 30, 2023 (CN) ......................... 202311427667.5

(51) Int. Cl.
*A63B 24/00* (2006.01)
*A63B 71/06* (2006.01)
(Continued)

(52) U.S. Cl.
CPC ...... *A63B 24/0075* (2013.01); *A63B 71/0622* (2013.01); *G06T 7/0016* (2013.01);
(Continued)

(58) Field of Classification Search
CPC ... A63B 24/0075; A63B 72/0622; G06T 7/90; G06T 7/0016; G06V 40/10; G06V 10/774
(Continued)

(56) References Cited

U.S. PATENT DOCUMENTS 11,986,652 B1 * 5/2024 Ritzen ................ A63B 24/0087
2004/0242976 A1 * 12/2004 Abreu .................... A61B 5/746
600/315

(Continued)

FOREIGN PATENT DOCUMENTS

TW I787982 B 12/2022

OTHER PUBLICATIONS

Office Action mailed to Corresponding Taiwanese Patent Application No. 112148841 dated Jun. 27, 2024.

(Continued)

*Primary Examiner* — William D Titcomb
(74) *Attorney, Agent, or Firm* — Rosenberg, Klein & Lee

(57) ABSTRACT

An automatic analysis system for fitness training comprises a database, a thermal image capturing unit and an analysis device. The database stores a training course and a target muscle group data. The thermal image capturing unit captures a first thermal image of the user after performing the training course. The analysis device is connected to the database and the thermal image capturing unit, and further comprises a muscle identifying module, a muscle temperature calculating module, and a comparing module. The muscle identifying module identifies the muscle groups of the user. The muscle temperature calculating module calculates muscle temperatures of the muscle groups respectively, and obtain a main training muscle group while the user is performing the training course. The comparing module compares the main training muscle group with the target muscle group data, and then generates a warning signal when the main training muscle group does not match the target muscle group data.

7 Claims, 6 Drawing Sheets

(51) Int. Cl.
*G06T 7/00* (2017.01)
*G06T 7/90* (2017.01)
*G06V 10/774* (2022.01)
*G06V 40/10* (2022.01)

(52) U.S. Cl.
CPC .............. *G06T 7/90* (2017.01); *G06V 10/774* (2022.01); *G06V 40/10* (2022.01); *A63B 2024/0068* (2013.01); *A63B 2071/065* (2013.01); *A63B 2220/05* (2013.01); *A63B 2220/805* (2013.01); *A63B 2230/50* (2013.01); *G06T 2207/10048* (2013.01); *G06T 2207/20081* (2013.01); *G06T 2207/30196* (2013.01)

(58) Field of Classification Search
USPC .......................................................... 382/128
See application file for complete search history.

(56) References Cited

U.S. PATENT DOCUMENTS

2012/0314021 A1* 12/2012 Tsang ..................... G02B 30/20 348/40
2018/0050237 A1* 2/2018 Dorombozi ........ A63B 21/4007
2018/0085630 A1* 3/2018 Capell .................... G16H 20/30
2018/0146184 A1* 5/2018 Yang ...................... H10K 59/35
2019/0118066 A1* 4/2019 Cardona ............ A63B 24/0062
2022/0245574 A1* 8/2022 Cella .................... G06Q 10/087
2023/0079396 A1* 3/2023 Sokolowski ....... A63B 24/0075 482/9
2024/0123288 A1* 4/2024 Barbalinardo ....... G06V 10/764
2025/0135285 A1* 5/2025 Yeh ...................... G06V 10/774
2025/0352856 A1* 11/2025 Miyazawa ......... A63B 24/0075

OTHER PUBLICATIONS

Notice of Allowance mailed to Corresponding Taiwanese Patent Application No. 112148841 dated Aug. 29, 2024.

* cited by examiner

AUTOMATIC ANALYSIS SYSTEM AND METHOD FOR FITNESS TRAINING

BACKGROUND OF THE INVENTION

1. Field of the Invention

The present invention relates to an analysis system and method for fitness training, and more particularly, the analysis system and method for fitness training to assist in analyzing muscle groups.

2. Description of the Prior Art

With the development of science and technology and the improvement of living standards, people are increasingly relying on electronic products. In order to stay away from the diseases caused by spending too much time on using electronic products, many people have been gradually exercising in their daily lives to maintain physical and mental health.

Fitness is one of the common sports, people can use fitness equipment to train different body muscle groups according to the functions and operation methods of the fitness equipment to achieve the effect of exercise. Generally speaking, different kinds of fitness equipment need to be used in accordance with correct posture and force output in order to exercise specific muscle groups. However, there are multiple muscle groups in the human body which are linked and continuously exert force during training. It is difficult for ordinary people to detect whether the exercise posture is correct when the user performs the fitness equipment. Taking rowing machine as an example, different muscle groups will be exercised depends on different gripping (such as neutral gripping, narrow gripping, and wide gripping). People use rowing machine with neutral gripping to exercise their latissimus dorsi muscles, and use rowing machine with wide gripping to exercise their deltoid muscle group. Therefore, except for professionals, it is difficult for ordinary people to deeply understand and immediately correct training movements. Accordingly, it will lead to exercise the wrong muscle groups with wrong postures, so as to reduce exercise efficiency

SUMMARY OF THE INVENTION

Therefore, the present invention provides an automatic analysis system for fitness training which is configured to assist in analyzing muscle groups of the user during fitness training to solve the problems with the prior art.

In one embodiment of the present invention, the automatic analysis system for fitness training comprises a database, a thermal image capturing unit, and an analysis device. The database is configured to store a training course and a target muscle group data corresponding to the training course. The thermal image capturing unit is configured to capture a first thermal image of the user after performing the training course. The analysis device is connected to the database and the thermal image capturing unit, and further comprises a muscle identifying module, a muscle temperature calculating module, and a comparing module. The muscle identifying module is configured to identify the muscle groups of the user by analyzing the first thermal image with a muscle group model. The muscle temperature calculating module is configured to calculate muscle temperatures of the muscle groups respectively, and obtain a main training muscle group while the user is performing the training course. The comparing module is configured to compare the main training muscle group with the target muscle group data. When the main training muscle group does not match the target muscle group data, the comparing module generates a warning signal.

In summary, the automatic analysis system for fitness training of the present invention can find out the real position of the muscle groups of the user through identifying and analyzing different body shapes and different body types from different users by the thermal image capturing unit and the muscle temperature calculating module. Furthermore, the automatic analysis system for fitness training of the present invention can find out the real muscle groups of the user during performing the training course by the muscle temperature calculating module, and compare whether the muscle groups of the user is in accordance with the target muscle group data corresponding to the training course, so as to improve exercise efficiency. In addition, the automatic analysis system for fitness training of the present invention can also determine multiple muscle groups as the main training muscle group to analyze whether the force exerted by the left and right sides of the user's body during exercising is balanced, so as to improve exercise efficiency.

BRIEF DESCRIPTION OF THE APPENDED DRAWINGS

DETAILED DESCRIPTION OF THE INVENTION

Figure 1:
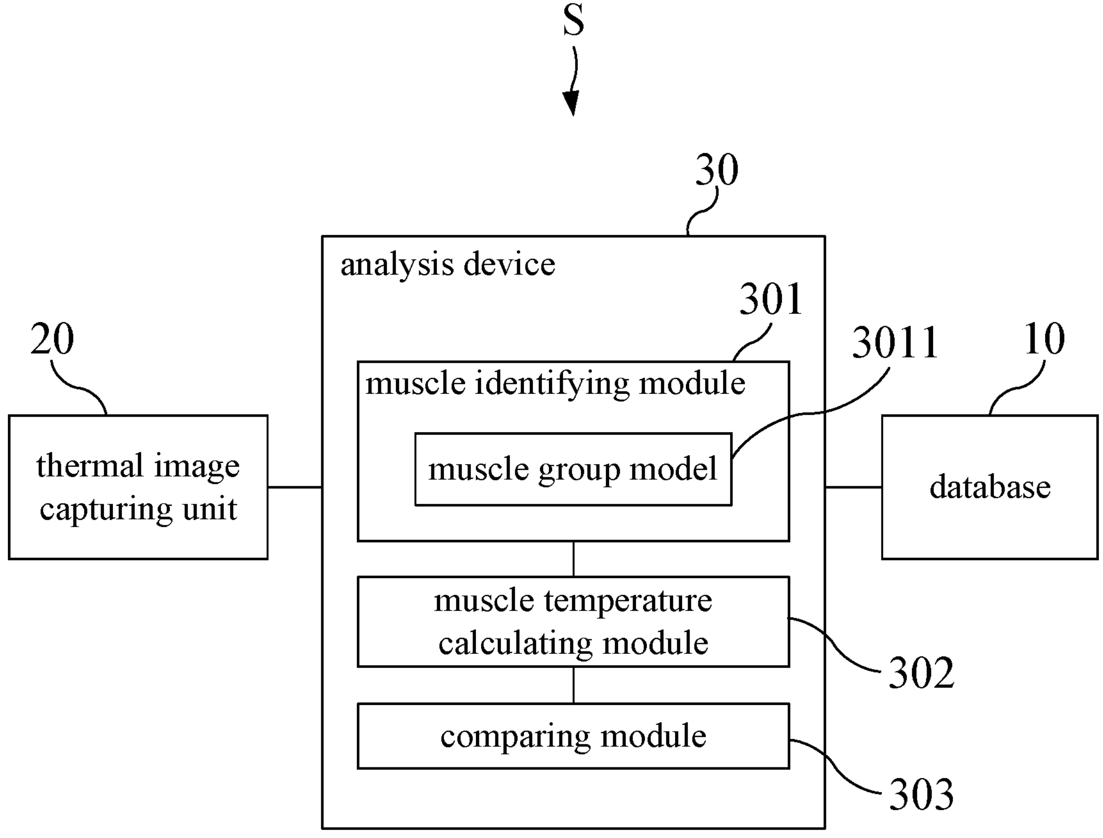
FIG. 1 is a functional block diagram illustrating an automatic analysis system for fitness training according to an embodiment of the present invention.

Please refer to FIG. 1. FIG. 1 is a functional block diagram illustrating an automatic analysis system S for fitness training according to an embodiment of the present invention. The automatic analysis system S for fitness training is configured to assist in analyzing muscle groups of a user during fitness training. The automatic analysis system S for fitness training comprises a database 10, a thermal image capturing unit 20, and an analysis device 30. The analysis device 30 is connected to the database 10 and the thermal image capturing unit 20. In practice, the database 10, the thermal image capturing unit 20, and the analysis device 30 can communicate with each other through wired or wireless connections.

As mentioned above, the database 10 is configured to store a training course and a target muscle group data corresponding to the training course. In practice, the database 10 can store a plurality of training courses, and each training course includes one or at least one target muscle group data. In practical applications, the training courses can be fitness exercises to train muscle groups, rowing, dumbbell press, back row, etc., and the target muscle group data can store the corresponding muscle group according each training course. For example, when the training course is rowing, the target muscle group data is latissimus dorsi muscles for the users; when the training course is dumbbell press, the target muscle group data is anterior deltoid muscles.

In the embodiment, the thermal image capturing unit 20 is configured to capture a first thermal image of the user after performing the training course. Wherein, the thermal image capturing unit 20 can be a thermal image camera. When the user is performing the training course, the thermal image camera can be placed near the user and the lens of the thermal image camera will be aimed at the target muscle group of the user to capture human body thermal images of the user during performing the training course. In addition, the thermal image capturing unit 20 can also be a thermal image processing chip and can be arranged or integrated in a terminal device (such as a smart phone, a computer, and a tablet computer). When the user is performing the training course, the terminal device can be placed near the user and capture human body thermal images of the user by camera and the thermal image processing chip of the terminal device.

In another embodiment, the thermal image capturing unit 20 can be the thermal image camera and also connected to the terminal device. The thermal image camera captures the human body thermal images of the user when the user is performing the training course, and transmits the human body thermal images of the user to the terminal device. The terminal device can communicate with the database 10 and the analysis device 30. In practice, the training courses stored in the database 10 are not limited to the aforementioned information. The training courses can further include course-related information, fitness equipment information matching the training courses, essentials of movements during exercise, information for wrong postures, demonstration videos, etc. After the user selects a training course, the terminal device can select appropriate course-related information from the database 10 and further display it on the display unit of the terminal device for the user to skim over. Next, after the user skims over the course-related information and performs training, the thermal image camera will capture the human body thermal images of the user (such as the first thermal image) after training.

Figure 2:
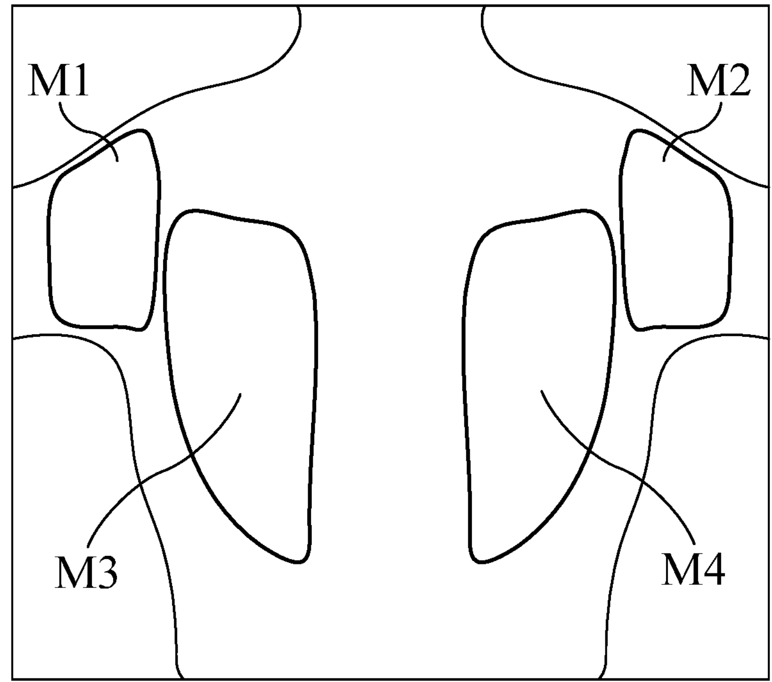
FIG. 2 is a schematic diagram illustrating the first thermal image of a user according to an embodiment of the present invention.
Figure 3:
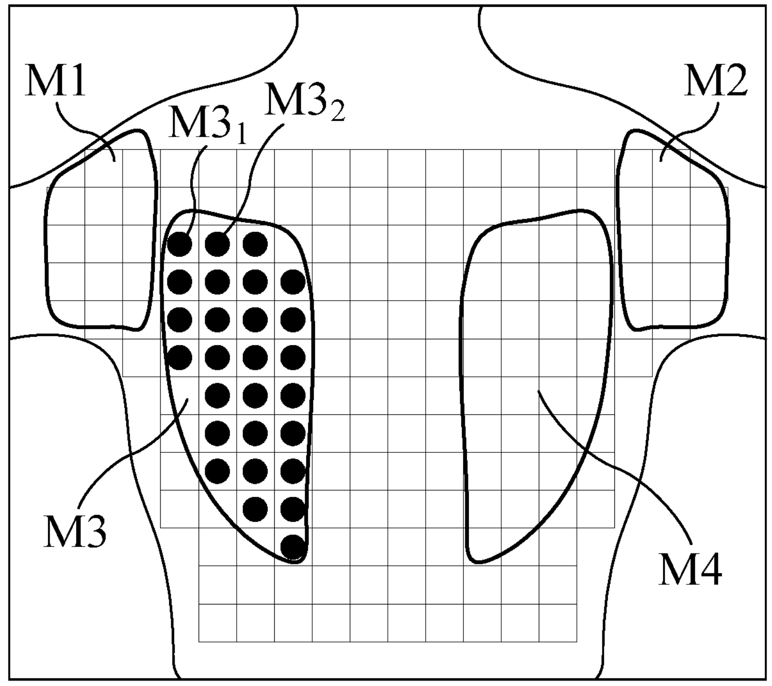
FIG. 3 is a schematic diagram illustrating the first thermal image of a user according to an embodiment of the present invention.

Please refer to FIG. 1, FIG. 2, and FIG. 3. FIG. 2 is a schematic diagram illustrating the first thermal image of a user according to an embodiment of the present invention. FIG. 3 is a schematic diagram illustrating the first thermal image of a user according to an embodiment of the present invention. Wherein, the analysis device 30 includes a muscle identifying module 301, a muscle temperature calculating module 302, and a comparing module 303. In practice, the analysis device 30 can be a server or a cloud server, and is configured to receive the first thermal image of the user by the thermal image capturing unit 20 or the terminal device. The muscle identifying module 301, the muscle temperature calculating module 302, and the comparing module 303 can be a single chip individually, or can be integrated into the same chip.

In the embodiment, the muscle identifying module 301 is configured to identify the muscle groups of the user by analyzing the first thermal image with a muscle group model 3011. Furthermore, the database 10 includes a plurality of human body thermal images and a plurality of muscle group labels. The muscle identifying module 301 analyzes the human body thermal images and the muscle group labels with machine learning to establish the muscle group model 3011. In practice, the database 10 can further store human body thermal images of different users and each muscle group of position data from human body. The muscle identifying module 301 can analyze the human body thermal images and the muscle group labels to the train muscle group models 3011 with supervised learning, semi-supervised learning, deep learning, etc. Therefore, when the analysis device 30 receives the first thermal image of the user, the muscle group model 3011 analyzes the body shape and the body type of the user to identify the muscle groups from the first thermal image. For example, as shown in FIG. 2, FIG. 2 illustrates the user's back. After the thermal image capturing unit 20 captures a first thermal image of the user, the muscle identifying module 301 will analyze the first thermal image with the muscle group model 3011, and further identify the area of the muscle groups of the user including the left deltoid muscle group M1, the right deltoid muscle group M2, the left latissimus dorsi muscle group M3, and the right latissimus dorsi muscle group M4. It should be noted that the muscle groups identified by the muscle identifying module which is described as two above-mentioned examples. In practice, the muscle identifying module can identify and mark all areas of muscle groups on the user's back.

In the embodiment, the muscle temperature calculating module 302 is configured to calculate muscle temperatures of the muscle groups respectively, and obtain a main training muscle group while the user is performing a training course. Furthermore, the muscle temperature calculating module 302 analyzes the first thermal image and the muscle groups with an image recognition algorithm to generate a plurality of pixels corresponding to the muscle groups respectively, and further generates the muscle temperature by calculating color level values of the pixels. In practice, the image recognition algorithm can be Mediapipe algorithm. After the analysis device 30 receives the first thermal image of the user captured by the thermal image capturing unit 20, the muscle temperature calculating module 302 divides the first thermal image into a plurality of grids through the Mediapipe algorithm, and each grid represents a pixel. Next, the muscle temperature calculating module 302 combines the plurality of grids with muscle group areas which are identified by the muscle identifying module 301. At this time, each muscle group area contains a plurality of grids (pixels).

As shown in FIG. 3, taking the left latissimus dorsi muscle group M3 as an example, the pixel numbers of the left latissimus dorsi muscle group M3 are $M3_1$, $M3_2$, $M3_n$, etc., and each pixel contains a color level value. At this time, the muscle temperature calculating module 302 calculates each color level value of each pixel to convert temperature values. Next, the muscle temperature calculating module 302 calculates the average value of all pixels of the left latissimus dorsi muscle group M3 to calculate value of the muscle group temperature of the left latissimus dorsi muscle group M3. Similarly, the muscle temperature calculating module 302 can also calculate the value of the muscle group temperature of the left deltoid muscle group M1, the left latissimus dorsi muscle group M3, and the right latissimus dorsi muscle group M4.

In addition, in the embodiment, the muscle temperature calculating module 302 pre-stores a temperature threshold value. The muscle temperature calculating module 302 determines the muscle group, which has the muscle group temperature greater than the threshold value, as the main training muscle group. In practice, the temperature threshold value is determined based on professionals or experience, or it can also be determined based on the user's physical fitness, body temperature, metabolic rate, etc.

When the muscle group temperature which is calculated by the muscle temperature calculating module 302 is larger than the temperature threshold, it means that the user uses this muscle group to perform the training course. At this time, the muscle temperature calculating module 302 determines this muscle group as the main training muscle group.

In the embodiment, the comparing module 303 is configured to compare the main training muscle group determined by the muscle temperature calculating module 302 with the target muscle group data corresponding to the training course, and selectively generate a warning signal based on the comparison results. In practice, warning signals can be sounds, texts, lights, patterns, etc. For example, when the use is performing a rowing training course, and the main training muscle group which is identified by the muscle temperature calculating module 302 is the latissimus dorsi, it means that the user is using the correct muscle group during performing the rowing training course. Namely, the muscle groups in which the user actually exercises are corresponding to the target muscle group data of the training course (rowing training course. At this time, the comparing module 303 does not generate the warning signal. On the contrary, when the use is performing a rowing training course, and the main training muscle group which is identified by the muscle temperature calculating module 302 is the deltoid muscle, it means that the user is using the incorrect muscles during performing the rowing training course. At this time, the comparing module 303 generates the warning signal to remind the user. In practice, the comparing module 303 can further transmit the warning signal to the terminal device, and the terminal device further include a warning unit (buzzer, horn, warning light, etc.). When the main training muscle group is not corresponding to the target muscle group data during performing the training course, the terminal device can generate the warning signal from the comparing module 303, and then the user can adjust the posture and the used muscle group when noticed.

In practical application, after the user selects a training course and then performs the training course. At this time, the thermal image capturing unit 20 captures the first thermal image of the user after performing the training course and transmits the first thermal image to the analysis device 30. Next, the muscle identifying module 301 identifies the muscle group of the user based on the first thermal image, and the muscle temperature calculating module 302 finds out the main training muscle group of the user according to the first thermal image and the muscle group identified by the muscle identifying module 301. Finally, the comparing module 303 further compares whether the main training muscle group determined by the muscle temperature calculating module 302 matches the target muscle group data corresponding to the training course stored in the database, so as to remind the user timely. Therefore, the automatic analysis system for fitness training of the present invention can find out the real position of the muscle groups of the user through the thermal image capturing unit and the muscle temperature calculating module identifying and analyzing different body shapes and different body types from different users. Furthermore, the automatic analysis system for fitness training of the present invention can find out the real muscle groups of the user during performing the training course by the muscle temperature calculating module, and compare whether the muscle groups of the user is in accordance with the target muscle group data corresponding to the training course, so as to improve exercise efficiency.

In addition, the automatic analysis system for fitness training of the present invention not only provides the embodiment as mentioned above, but also provides other modes to determine the main training muscle group. In another embodiment of the present invention, the thermal image capturing unit 20 captures a second thermal image of the user before performing the training course, and the muscle identifying module 301 analyzes the second thermal image with the muscle group model 3011 to identify the muscle group of the user. The muscle temperature calculating module 302 calculates an initial muscle group temperature corresponding to the muscle groups of the second thermal image. In practice, when the user selects the training course before performing the training course, the thermal image capturing unit 20 can capture the second thermal image of the user before performing the training course. That is to say, the thermal image capturing unit 20 captures the thermal images of the temperature distribution when the user has not exercised with any muscle group. Next, the muscle identifying module 301 can find the position of each muscle group according to the second thermal image, and the muscle temperature calculating module 302 calculates each initial muscle group temperature corresponding to the muscle groups of the second thermal image, that is, the temperature of each muscle group of the user before exercising.

Furthermore, the muscle temperature calculating module 302 determines the muscle group, which has a largest difference between its muscle group temperature and its initial muscle group temperature, as the main training muscle group. In practice, since each muscle group has a different initial contraction degree in different training postures, the initial temperature of each muscle group is also different. The automatic analysis system S for fitness training of the present invention respectively captures the second thermal image and the first thermal image of the user before and after performing the training course, and then further calculates the difference between the initial muscle group temperature before exertion and the muscle group temperature after exertion of each muscle group. When the temperature difference is larger, the force output of the muscle group is higher. Then, the muscle temperature calculating module 302 determines the muscle group, which has a largest difference between its muscle group temperature and its initial muscle group temperature, as the main training muscle group.

In addition, the automatic analysis system S of the present invention can also determine multiple muscle groups as the main training muscle group at the same time. In another embodiment of the present invention, the muscle temperature calculating module 302 can further sort the corresponding muscle groups according to the temperature difference from large to small, and determine the top two temperature difference, corresponding to each muscle group, as the main training muscle group. Taking FIG. 3 as an example, the muscle temperature calculating module 302 sorts the muscle groups, and the sorting order is the left deltoid muscle group M1, the right latissimus dorsi muscle group M4, the right deltoid muscle group M2, and the latissimus dorsi muscle group M3. At this time, the muscle temperature calculating module 302 determines the left deltoid muscle group M1 and the right latissimus dorsi muscle group M4 as the main training muscle group. When the user performs a dumbbell press of the training session (the corresponding target muscle group data is the left deltoid muscle group and the right deltoid muscle group), and the muscle temperature calculating module 302 determines the left deltoid muscle group M1 and the right latissimus dorsi muscle group M4 as the main training muscle group. It means that the user uses the correct muscle group (the left deltoid muscle group M1) with his left hand, but the user uses the wrong muscle group (the right latissimus dorsi muscle group M4) with his right hand; namely, unbalanced force is exerted by the left and right sides of the user's body. At this time, the comparing module 303 will generate a warning signal to remind the user to adjust the posture and force output method, so as to improve exercise efficiency.

Figure 4:
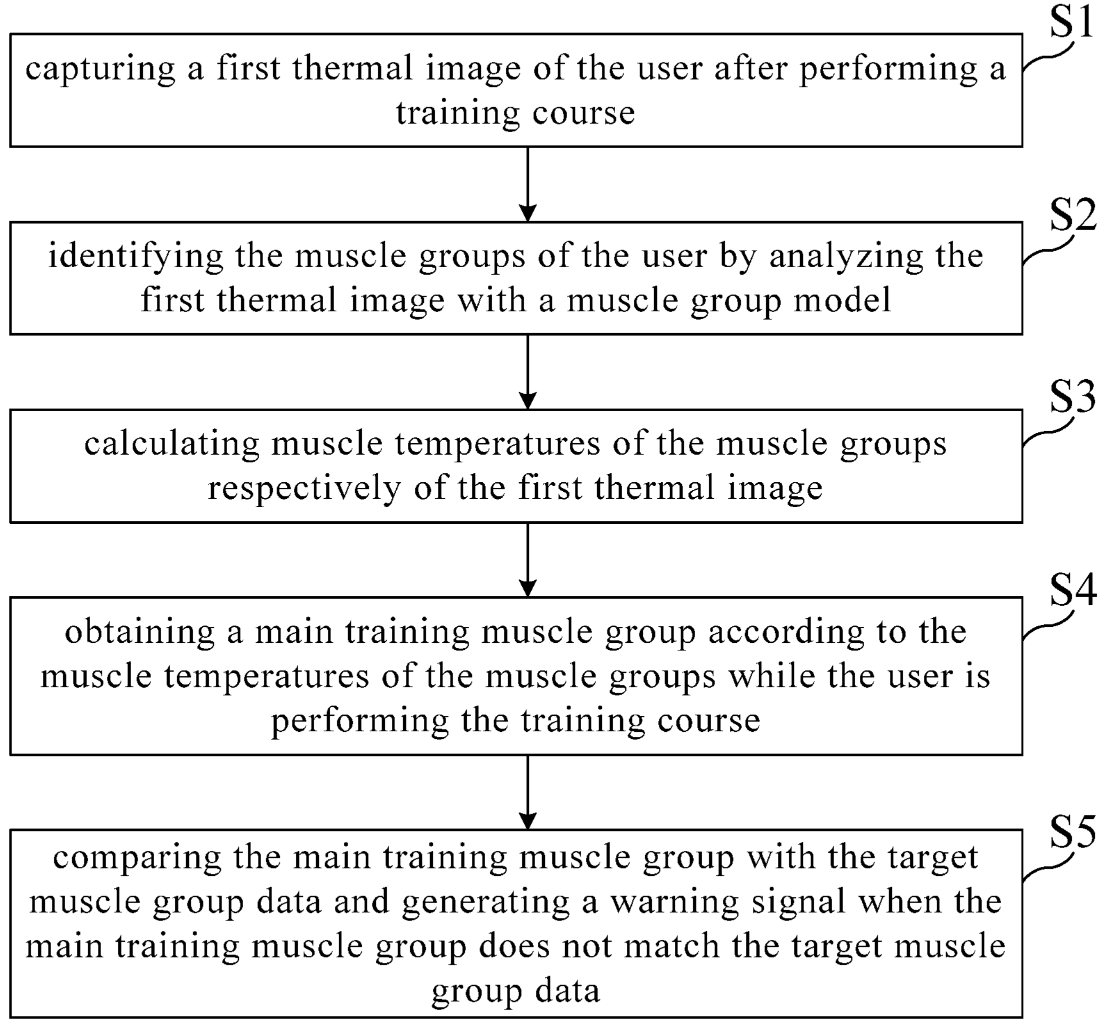
FIG. 4 is a flow chart illustrating the automatic analysis method for fitness training according to an embodiment of the present invention.

Please refer to FIG. 1, and FIG. 4. FIG. 4 is a flow chart illustrating the automatic analysis method for fitness training according to an embodiment of the present invention. The steps of FIG. 4 can be achieved through the automatic analysis system S for fitness training of FIG. 1. In the present embodiment, the automatic analysis method for fitness training comprises the following steps of: step S1: capturing a first thermal image of the user after performing a training course by the thermal image capturing unit 20; step S2: identifying the muscle groups of the user by the muscle identifying module 301 obtained by analyzing the first thermal image with a muscle group model 3011; step S3: calculating muscle temperatures of the muscle groups respectively of the first thermal image by the muscle temperature calculating module 302; step S4: obtaining a main training muscle group according to the muscle temperatures of the muscle groups while the user is performing the training course by the muscle temperature calculating module 302; and step S5: comparing the main training muscle group with the target muscle group data and generating a warning signal when the main training muscle group does not match the target muscle group data by the comparing module 303.

Figure 5:
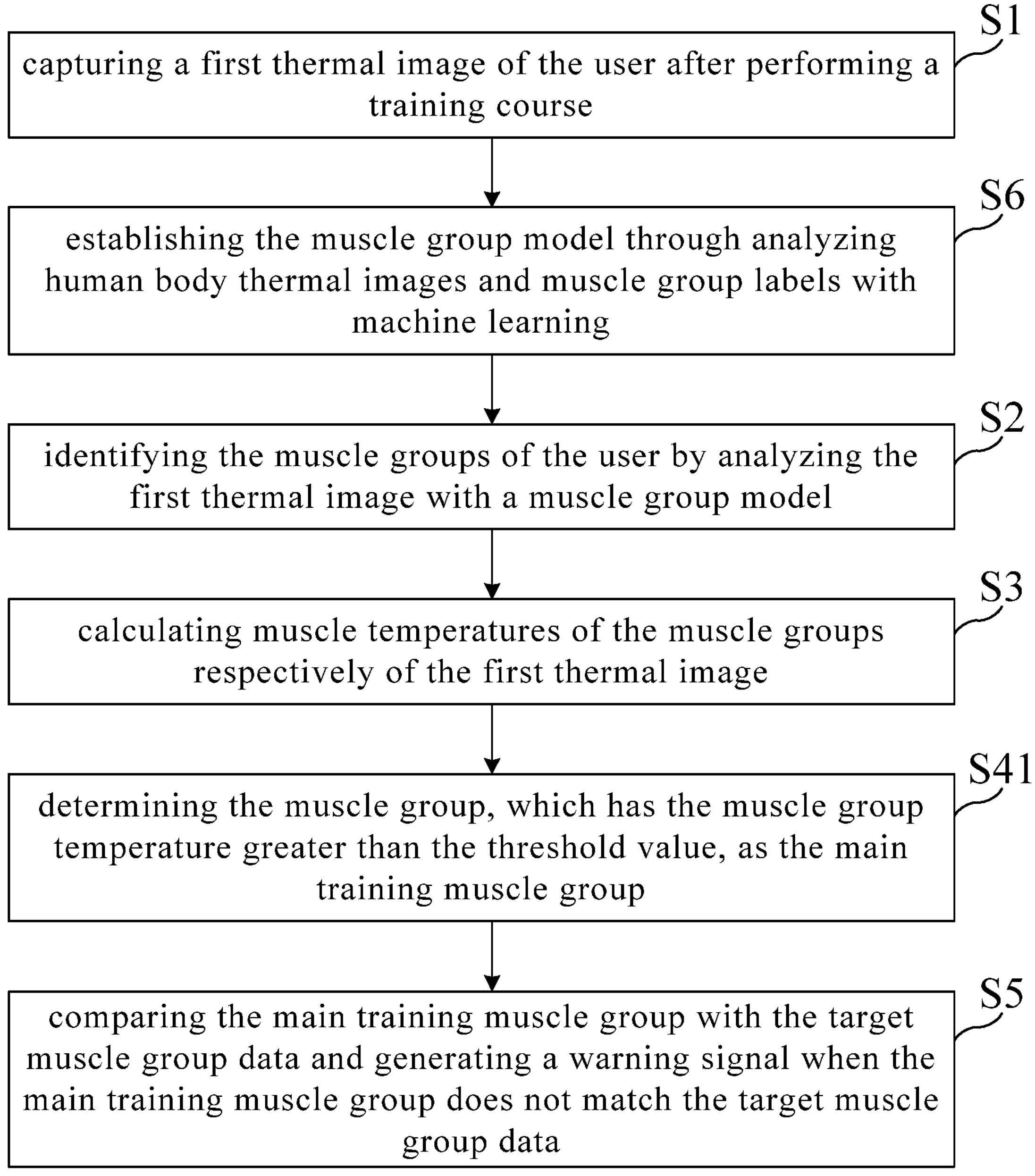
FIG. 5 is a flow chart illustrating the automatic analysis method for fitness training according to an embodiment of the present invention.

Please refer to FIG. 1, FIG. 4, and FIG. 5. FIG. 5 is a flow chart illustrating the automatic analysis method for fitness training according to an embodiment of the present invention. The steps of FIG. 5 can be achieved through the automatic analysis system S for fitness training of FIG. 1. FIG. 5 further includes steps from FIG. 4. In the embodiment, the automatic analysis method for fitness training comprises the following steps of: step S6: establishing the muscle group model 3011 through analyzing human body thermal images and muscle group labels stored in the database 10 with machine learning by the muscle identifying module 301. Moreover, the step S4 can further include the following step of: step S41: determining the muscle group, which has the muscle group temperature greater than the threshold value, as the main training muscle group by the muscle temperature calculating module 302. It should be noted that the muscle group model 3011 of the step S6 is not limited to the position in FIG. 5. In practice, establishing the muscle group model 3011 of the step can also be executed before step S1.

Figure 6:
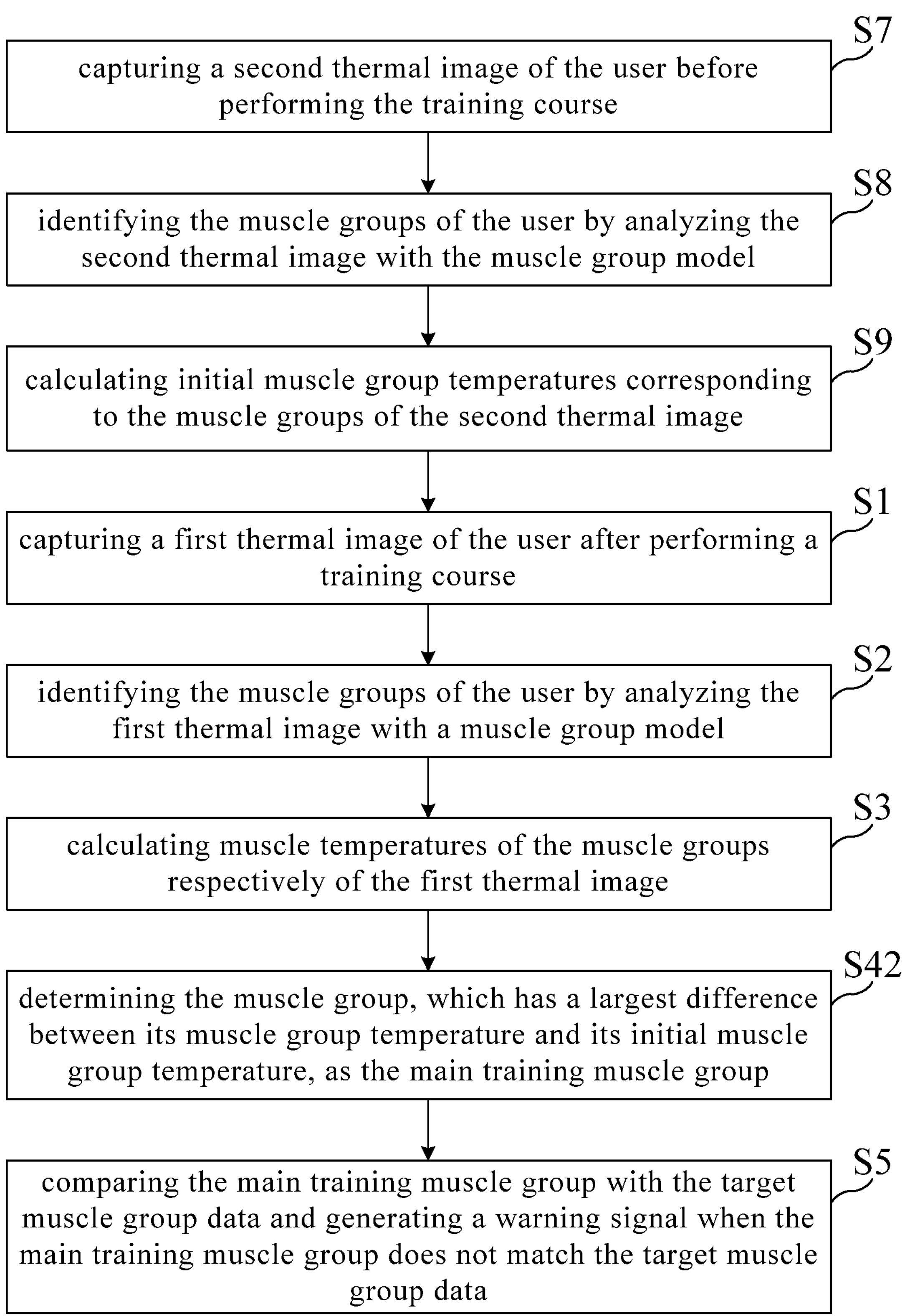
FIG. 6 is a flow chart illustrating the automatic analysis method for fitness training according to an embodiment of the present invention.

Please refer to FIG. 1, and FIG. 6. FIG. 6 is a flow chart illustrating the automatic analysis method for fitness training according to an embodiment of the present invention. The steps of FIG. 6 can be achieved through the automatic analysis system S for fitness training of FIG. 1. In the present embodiment, the automatic analysis method for fitness training comprises the following steps of: step S7: capturing a second thermal image of the user before performing the training course by the thermal image capturing unit 20; step S8: identifying the muscle groups of the user by analyzing the second thermal image with the muscle group model by the muscle identifying module 301; step S9: calculating initial muscle group temperatures corresponding to the muscle groups of the second thermal image by the muscle temperature calculating module 302; and, the step S4 of FIG. 4 can further comprises the following step of: step S42: determining the muscle group, which has the largest difference between its muscle group temperature and its initial muscle group temperature, as the main training muscle group by the muscle temperature calculating module 302.

In practice, the automatic analysis system S for fitness training first executes step S7 before the user performs the training course; the automatic analysis system S for fitness training first executes step S8 and step S9 while the user is performing the training course; next, the automatic analysis system S for fitness training first executes step S1 to step S5 after the user performs the training course. It should be noted that the execution sequence of the step S8 and the step S9 in FIG. 6 is not limited hereto. In another embodiment, the automatic analysis system S can execute step S7 and step S1 in sequence, and then execute step S8 and step S2, and the step S9 and the step S3 at the same time. That is to say, the thermal image capturing unit 20 of the automatic analysis system S for fitness training can capture the second thermal image and the first thermal image of the user before and after performing the training course, and then simultaneously transmit them to the analysis device 30 to analysis.

In summary, the automatic analysis system for fitness training of the present invention can find out the real position of the muscle groups of the user through identifying and analyzing different body shapes and different body types from different users by the thermal image capturing unit and the muscle temperature calculating module. Furthermore, the automatic analysis system for fitness training of the present invention can find out the real muscle groups of the user during performing the training course by the muscle temperature calculating module, and compare whether the muscle groups of the user is in accordance with the target muscle group data corresponding to the training course, so as to improve exercise efficiency. In addition, the automatic analysis system for fitness training of the present invention can also determine multiple muscle groups as the main training muscle group to analyze whether the force exerted by the left and right sides of the user's body during exercising is balanced, so as to improve exercise efficiency.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An automatic analysis system for fitness training, configured to assist in analyzing muscle groups of a user during fitness training, the automatic analysis system for fitness training comprising:

a database, configured to store a training course and a target muscle group data corresponding to the training course;

a thermal image capturing unit, configured to capture a first thermal image of the user after performing the training course and capture a second thermal image of the user before performing the training course; and an analysis device, connected to the database and the thermal image capturing unit, the analysis device further comprising:

a muscle identifying module, configured to identify the muscle groups of the user by analyzing the first thermal image with a muscle group model and analyze the second thermal image with the muscle group model to identify the muscle groups of the user;

a muscle temperature calculating module, configured to calculate a muscle temperature of the muscle groups of the first thermal image and calculate an initial muscle group temperature of the muscle groups of the second thermal image, and determine the muscle group with the largest difference between the muscle temperature and the initial muscle group temperature as a main training muscle group during the training course; and a comparing module, configured to compare the main training muscle group with the target muscle group data and generate a warning signal when the main training muscle group does not match the target muscle group data.

2. The automatic analysis system for fitness training of claim 1, wherein the muscle temperature calculating module analyzes the first thermal image and the muscle groups with an image recognition algorithm to generate a plurality of pixels corresponding to the muscle groups respectively, and further generates the muscle temperature by calculating color level values of the pixels.

3. The automatic analysis system for fitness training of claim 1, wherein the muscle temperature calculating module pre-stores a temperature threshold value, and the muscle temperature calculating module determines the muscle group, which has the muscle group temperature greater than the threshold value, as the main training muscle group.

4. The automatic analysis system for fitness training of claim 1, wherein the database comprises a plurality of human body thermal images and a plurality of muscle group labels, the muscle identifying module analyzes the human body thermal images and the muscle group labels with machine learning to establish the muscle group model.

5. An automatic analysis method for fitness training, configured to assist in analyzing muscle groups of a user during fitness training, the automatic analysis method for fitness training comprising the following steps of:

capturing a second thermal image of the user before performing the training course;

capturing a first thermal image of the user after performing a training course;

identifying the muscle groups of the user by analyzing the first thermal image with a muscle group model, and identifying the muscle groups of the user by analyzing the second thermal image with the muscle group model;

calculating a muscle temperatures of the muscle groups respectively of the first thermal image, and calculating an initial muscle group temperature of the muscle groups of the second thermal image;

determining the muscle group with the largest difference between the muscle temperature and the initial muscle group temperature as a main training muscle group during the training course; and comparing the main training muscle group with the target muscle group data and generating a warning signal when the main training muscle group does not match the target muscle group data.

6. The automatic analysis method for fitness training of claim 5, wherein in the obtaining a main training muscle group while the user is performing the training course of the step further comprises the following step of:

determining the muscle group, which has the muscle group temperature greater than the threshold value, as the main training muscle group.

7. The automatic analysis method for fitness training of claim 5, further comprising the following step of:

analyzing human body thermal images and muscle group labels with machine learning to establish the muscle group model.

* * * * *